(12) United States Patent
Zhao et al.

(10) Patent No.: US 8,704,975 B2
(45) Date of Patent: Apr. 22, 2014

(54) ELECTROLUMINESCENT DISPLAYS

(75) Inventors: Yong Zhao, Cambridge (GB);
Christopher Miles Evans, Essex (GB)

(73) Assignee: MFlex UK Limited, Cambridge (GB)

( * ) Notice: Subject to any disclaimer, the term of this patent is extended or adjusted under 35 U.S.C. 154(b) by 705 days.

(21) Appl. No.: 12/892,288

(22) Filed: Sep. 28, 2010

(65) Prior Publication Data

US 2011/0234084 A1   Sep. 29, 2011

Related U.S. Application Data

(63) Continuation of application No. PCT/GB2009/000835, filed on Mar. 27, 2009.

(30) Foreign Application Priority Data

Mar. 29, 2008 (GB) .................................. 0805751.5

(51) Int. Cl.
*G02F 1/1335* (2006.01)

(52) U.S. Cl.
USPC .......................................................... 349/69

(58) Field of Classification Search
USPC .......................................................... 349/69
See application file for complete search history.

(56) References Cited

U.S. PATENT DOCUMENTS

| | | | | |
|---|---|---|---|---|
| 5,115,329 A * | 5/1992 | Ikarashi et al. | ................... | 349/69 |
| 5,121,234 A * | 6/1992 | Kucera | .............................. | 349/69 |
| 6,017,468 A * | 1/2000 | Chung et al. | ................ | 252/299.5 |
| 7,486,342 B2 * | 2/2009 | Mathey et al. | ................... | 349/16 |
| 7,649,595 B2 * | 1/2010 | Masutani et al. | ................ | 349/89 |
| 2002/0001052 A1 * | 1/2002 | Kornfield et al. | ................ | 349/88 |
| 2002/0113753 A1 * | 8/2002 | Sullivan et al. | ..................... | 345/6 |
| 2002/0197425 A1 * | 12/2002 | Wolf et al. | .................... | 428/35.2 |
| 2003/0052869 A1 | 3/2003 | Fujii et al. | | |
| 2003/0222242 A1 * | 12/2003 | Harada et al. | .............. | 252/299.5 |
| 2005/0129875 A1 * | 6/2005 | Shukla et al. | .................. | 428/1.2 |
| 2008/0239211 A1 * | 10/2008 | Suzuki et al. | ................... | 349/96 |
| 2010/0134723 A1 | 6/2010 | Evans | | |

FOREIGN PATENT DOCUMENTS

| | | |
|---|---|---|
| CN | 1403856 A | 3/2003 |
| EP | 1 380 879 A1 | 1/2004 |
| EP | 1 731 949 A1 | 12/2006 |
| WO | 02/31589 A1 | 4/2002 |
| WO | 03/083523 A2 | 10/2003 |
| WO | 2005/121878 A1 | 12/2005 |

OTHER PUBLICATIONS

English translation of Official Communication issued in corresponding Chinese Patent Application No. 200980116860.9, mailed on Dec. 14, 2011.
Official Communication issued in International Patent Application No. PCT/GB2009/000835, mailed on Dec. 30, 2009.

* cited by examiner

*Primary Examiner* — Timothy L Rude
(74) *Attorney, Agent, or Firm* — Keating & Bennett, LLP

(57) ABSTRACT

An electroluminescent display comprising a mask defining the information to be displayed and an electroluminescent (EL) backlight. The mask compress a layer (13) of physically-stabilized liquid crystal switchable to define the information to be displayed mounted in front of an EL layer (16) of the backlight. At least one pair of electrodes (12, 20) are arranged to generate, in use, an electric field across both the EL layer (16) and the LC layer (13). A barrier layer (15) is provided between the LC layer (13) and the EL layer (16) that restricts migration of liquid crystal from the LC layer (13) to the EL layer (16).

21 Claims, 1 Drawing Sheet

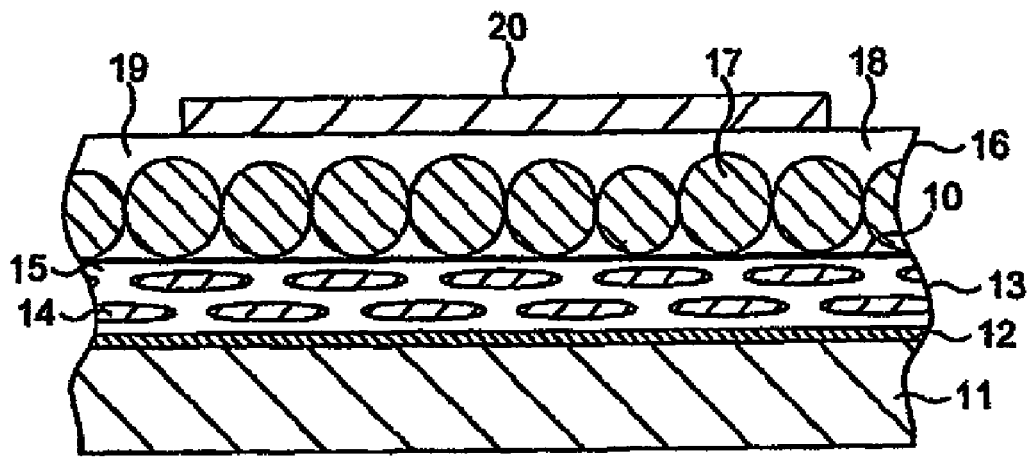

FIG. 1

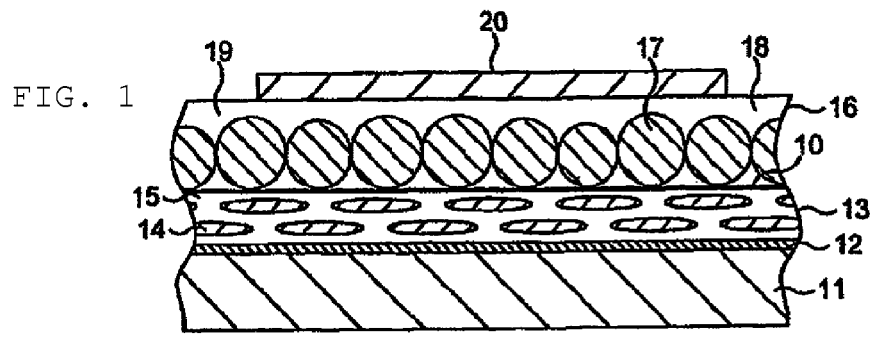

FIG. 2

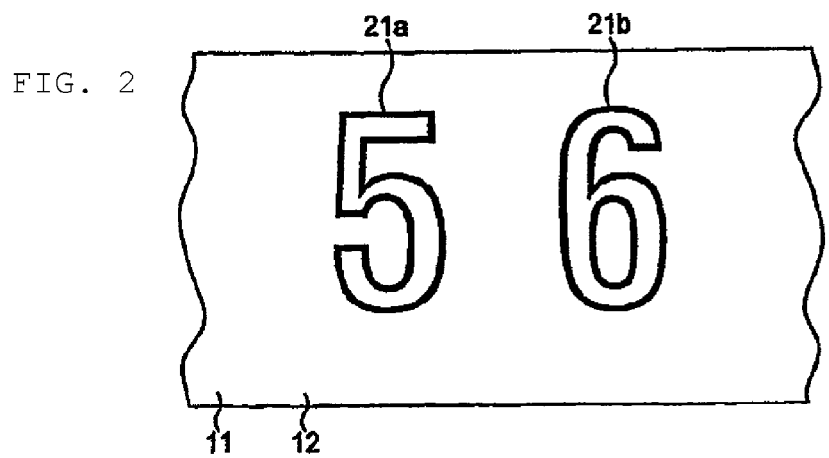

FIG. 3

| Barrier Polymer | Level of LC migration | Electro-optic characterisation |
|---|---|---|
| Celvol 205 PVA | No migration observed | Performance maintained |
| LuxPrint 285 | Medium level of migration | Decrease in performance |
| Diofan B200 PVDC | High level of migration | Decrease in performance |
| Celvol 205/EAA (9:1) | Low level of migration | Slight decrease in performance |
| Celvol 205/EAA (3:1) | Medium level of migration | Decrease in performance |

ELECTROLUMINESCENT DISPLAYS

BACKGROUND OF THE INVENTION

1. Field of the Invention

This invention is concerned with electroluminescent displays, and more specifically to displays that are electroluminescent/liquid crystal hybrids.

2. Description of the Related Art

Certain materials are electroluminescent—that is, they emit light, and so glow, when an electric field is generated across them. The first known electroluminescent materials were inorganic particulate substances such as zinc sulphide, while more recently-found electroluminescent materials include a number of small-molecule organic emitters known as organic light emitting diodes (OLEDs) and some plastics—synthetic organic polymeric substances—known as light-emitting polymers (LEPs). Inorganic particulates, in a doped and encapsulated form, are still in use, particularly when mixed into a binder and applied to a substrate surface as a relatively thick layer; LEPs can be used both as particulate materials in a binder matrix or, with some advantages, on their own as a relatively thin continuous film.

This electroluminescent effect has been used in the construction of displays. In some types of displays an electroluminescent (EL) material—generally referred to in this context as a phosphor—is provided to form a backlight which can be seen through a mask that defines whatever characters the display is to show. In other types, the displays are arranged with shaped electrodes such that small individual areas of EL material can be selectively activated. These displays have many applications; examples are a simple digital time and date display (to be used in a watch or clock), a mobile phone display, the control panel of a household device (such as a dishwasher or washing machine), and a handheld remote controller (for a television, video or DVD player, a digibox, stereo or music centre or similar entertainment device).

International patent application No: WO 2005/0121878 describes an electroluminescent display (Hybrid Display) with a Liquid Crystal (LC) mask that is switchable in individual areas, between "on"/transparent (so that the backlight can shine therethrough) and "off/opaque (so that the backlight's light is blocked thereby). The LC mask and the EL backlight are formed as a single integral unit wherein both components (the LC mask and EL backlight) are operated using common electrodes—the EL backlight being created as an electroluminescent material layer mounted directly on the rear of or behind the layer of liquid crystal material.

It will be appreciated that it is essential that the LC material be in a physically-stabilised form rather than in the normal "liquid", mobile, form implied by its name.

The inventor has realised that a polymer dispersed liquid crystal (PDLC) film consisting of droplets of liquid crystal, typically nematic or cholestic in nature, dispersed in a polymer matrix (binder) is suitable for the LC mask of such a hybrid display.

By including a dichroic dye in the PDLC, the unpowered state can be strongly absorbing as well as scattering, whilst the powered state combines transparency with low absorption. This type of PDLC is known as NCAP (entrapped nematic curvilinear aligned phase) and the inventor has found the NCAP type of PDLC to be particularly suitable for use as the LC material in the hybrid display. In particular, NCAP PDLCs minimise dye migration into the binder, and so do not degrade the achievable contrast.

These films can be constructed using an emulsification method, or by using one of a number of phase separation techniques. The emulsification method uses mechanical shear to disperse dyed liquid crystal organic oil into an aqueous-based medium comprising a water-soluble polymer, for example polyvinyl alcohol (PVA), which is to form the polymer matrix.

The formation of the display can be achieved by a number of methods. WO 2005/0121878 discloses a method wherein each of the various layers is screen-printed into place (apart from the ITO front electrode, which is usually sputtered onto the substrate), through masks that define the shape, size and position of each layer of the display, using suitable pastes that are subsequently dried, set or cured, as appropriate, prior to the next layer or collection of layers being applied.

The inventor has found that using an NCAP PDLC material with PVA as a binder is unsatisfactory because, even though the PVA is an excellent binder, providing very stable emulsions, it absorbs water readily from the atmosphere, which in turn degrades the electro-optic performance of the PDLC through water dependent leakage currents. Accordingly, displays manufactured using PVA as a binder in the LC layer have poor environmental stability, which can result in defects, such as spotting of the display.

UK patent application No: 0625114.4 proposes a solution to this problem wherein the PDLC layer comprises UV curable polyurethane. A display having such a PDLC layer may have increased environmental stability and improved electro-optical behaviour.

It has been found that hybrid displays comprising a PDLC layer fade when exposed to elevated temperatures, such as 50 or 60° C. This fading has been observed as an increase in the reflectivity of the display, particular in non-illuminated areas of the display. This increase in reflectivity decreases the contrast between the illuminated and non-illuminated areas of the display and hence reduces legibility of the display. It has also been observed that the print quality of the phosphor layer printed onto the PDLC is lower than a phosphor layer printed onto an ITO layer.

Investigation has showed that the fading is not caused by degradation of the dye used to colour the liquid crystal but by migration of the dye and liquid crystal out of the PDLC layer, through the EL layer, to an insulator layer used as a capping layer on the rear of the display. This insulator layer becomes coloured as a result of the migration of the dye. Fourier Transform Infrared Spectroscopy (FTIR) has been used to demonstrate the presence of liquid crystal in the insulator layer of a test lamp that had been aged at 85° C. for approximately 18 hrs.

SUMMARY OF THE INVENTION

According to a first aspect of the invention there is provided an electroluminescent display comprising a mask defining the information to be displayed, an electroluminescent (EL) backlight, the mask comprising a layer of physically stabilised liquid crystal switchable to define the information to the displayed mounted in front of an EL layer of the backlight, at least one pair of electrodes arranged to generate, in use, an electric field across both the EL layer and the LC layer and a barrier layer between the LC layer EL layer that restricts migration of liquid crystal from the LC layer to the EL layer.

The barrier layer reduces, or even prevents, the migration of liquid crystal from the liquid crystal layer to the EL layer reducing or even eliminating fading of the display.

According to a second aspect of the invention there is provided a method of manufacturing a display comprising forming a mask defining the information to be displayed, the mask comprising a layer of physically stabilised liquid crystal, forming a barrier layer, forming an EL layer of a backlight with the liquid crystal layer mounted in front of the EL layer and forming at least one pair of electrodes arranged to generate, in use, an electric field across both the EL layer and the LC layer, wherein the barrier layer restricts migration of liquid crystal from the liquid crystal layer to the EL layer, It will be understood that "front" as used herein means the side of the display from which the display is to be viewed.

The liquid crystal layer is in a physically stabilised form rather than its normal liquid mobile form, for example the liquid crystal may be liquid crystal vesicles encapsulated in a polymer matrix, such as a polymer-dispersed liquid crystal (PDLC), or a polymer stabilised liquid crystal (PSLC).

Layers forming the backlight may be printed directly on the barrier layer. Alternatively, layers of the EL backlight may be formed at a unit separate (i.e. remote) from the LC layer and the barrier layer, which is then adhered to the rear of the barrier layer.

The barrier layer may be arranged to limit the migration of liquid crystal from the LC layer to layers behind the mask such that no significant fading of the display occurs due to migration of the liquid crystal under pre-determined criteria. It will be understood that the term "significant fading" is used herein to mean changes in contrast of the display that are noticeable to the naked eye, The barrier layer may be arranged to limit the migration of liquid crystal from the LC layer to layers behind the mask such that, when the display is heated to 85 degrees over 18 hrs, there is virtually no change, and preferably no change whatsoever, in contrast between illuminated and non-illuminated areas of the display.

The EL material backlight may comprise an insulating layer behind a layer of electroluminescent material.

The barrier layer may comprise a material in which the liquid crystal has low solubility. As liquid crystal particles in the LC layer cannot dissolve in the barrier layer, migration of liquid crystal through the barrier layer to the EL backlight is reduced or even eliminated.

The barrier layer may comprise a material in which the liquid crystal has solubility lower than the solubility of liquid crystal in phosphor. In particular, the barrier layer may comprise material in which the liquid crystal has a low enough solubility such that no significant fading of layers behind the LC layer occurs due to migration of the liquid crystal under pre-determined criteria, for example, no significant fading of the layers behind the LC layer occurs due to migration of the liquid crystal when the display is heated at a set temperature for a set time, for example 85° C. for approximately 18 hrs.

Solubility can be measured as the maximum amount of solute that can dissolve per amount of solvent under specified conditions. The barrier layer may comprise a material in which the liquid crystal has substantially zero, and preferably zero, solubility at room temperature and atmospheric pressure.

The barrier layer may comprise a hydrophilic layer, in particular a hydrophilic polymer. The polymer may be a water soluble polymer such as polyvinyl alcohol, polyvinyl alcohol copolymer, such as an ethylene vinyl alcohol copolymer, polyvinyl butyral, gelatin and its derivatives, cellulose derivatives, polyacrylics and derived polymers and polyacrylic acids and derived polymers. Alternatively, the polymer may be a non-water soluble polymer that can be carried in an emulsion and/or dispersion, such as polyurethanes, polyethylene-acrylic acid copolymer and derived copolymers, polymethacrylics and derived copolymers and polymethacrylic acids and derived copolymers.

In another embodiment, the polymer may be a hydrophobic polymer, such as polyvinylidenefluoride, polyamides, polysiloxanes, polyvinyl esters.

Preferably, the polymer is a polyvinyl alcohol (PVA), or a polyvinyl alcohol copolymer such as an ethylene vinyl alcohol copolymer. Preferably the polyvinyl alcohol or polyvinyl alcohol copolymer has a degree of hydrolysis of between 72% and 99%. When the polymer is ethylene vinyl alcohol copolymer the degree of hydrolysis may be between 75% and 99%, and/or an ethylene content may be less than 51%. The ethylene content may be between 5 and 51%. It has been found that PVA and polyvinyl alcohol copolymers are suitable for use as the barrier layer because liquid crystal has low solubility in this material and the material have the required level of hydrophilicity to function as desired.

Furthermore, the barrier layer may comprise a polymer in which the liquid crystal has low solubility and a further polymer to improve the adhesion of the barrier layer with the LC layer and/or the EL layer.

When a hydrophilic barrier layer absorbs water it increases its electrical conductivity (reduces its resistivity) such that the electrical characteristics of the display may be similar to such a display without the barrier layer. For example, a completely dry hydrophilic polymer layer may have a resistance of about $10^{10}$ Ωcm, whereas, after absorbing water from the environment, its resistivity may reduce to $10^6$ or even $10^5$ Ωcm. In this way, the introduction of a hydrophilic barrier layer has little, or even no, impact on the electrical characteristics of the display, but acts to prevent migration of the liquid crystal.

The polymer matrix of the liquid crystal layer may be any one of water based, monomer free radiation curable urethane oligomer dispersions; acrylic functional polyurethane dispersions and acrylic urethane emulsions. In the most preferred embodiment, the polymer matrix is a UV curable polymer matrix, for example a UV curable aliphatic polyurethane resin, such as those supplied by DSM Neoresin under the trade names NeoRez® R440, R440, R445, R401 and R501. However, it is believed that the matrix may comprise other film forming UV curable polymers, for example, UV curable polyurethane dispersions (known in the art as UV-PUD), acrylic dispersions, silicones and mixtures therefore. The matrix resin can be formed from an aqueous solution or emulsion that contains very low levels, and preferably no, co-solvent.

Preferably, the polymer matrix comprises substantially no PVA. The term "substantially no PVA", means the polymer matrix comprises less than 5% PVA, preferably less than 1% PVA and most preferably, no PVA.

A number of different component materials could be used to form a shell of the vesicles. One example of a pair of component materials that may be used for the shell is a multifunctional iscocyanate (e.g. Desmodur N3200—sold by Bayer) and a diamine, such as ethylene diamine. The reaction may be catalysed by a tertiary amine, such as DABCO.

Notionally, the liquid crystal may be any one of the main types such material—such as nematic and cholesteric or chiral nematic—the requirement is, generally, for a liquid crystal based material that allows polariserless high contrast electro-optical shuttering operation between a field "on" state that is optically transmissive and a base field "off" state that us less transmissive than the "on" state.

Preferably, the liquid crystal contains a dye. In one arrangement, the liquid crystal includes up to 6% by weight of a dye, preferably a dichroic dye. In a preferred arrangement, levels of dye in the liquid crystal are 3-5% by weight. The dye attaches to the liquid crystal molecules and acts to obscure light when no field is applied across the liquid crystal but when a field is applied, the dye molecules are aligned for allowing the transmission of light. As the dye is attached to the liquid crystal, the barrier layer limits the migration of both the liquid crystal and dye to layers behind the liquid crystal layer.

The LC mask and the EL backlight may be constructed as a single entity. By this, it is meant that the LC mask is adhered to the EL backlight or sandwiched between layers of the display to be immovable with respect to the backlight.

From the front to back the backlight comprises: an electrically-insulating transparent front layer known as the substrate, usually made of glass or plastic, such as polyethylene terephthalate (PET) or polyethylene naphthalate (PEN); a first electrically-conductive film, for example, made from a material such as indium tin oxide (ITO), forming one electrode—the front electrode—of the backlight; the electroluminescent (EL) layer (usually a particulate phosphor within a binder matrix); an electrically-insulating layer of a material—usually a ceramic—having a relatively high dielectric constant (relative permittivity) of around 50 (in some applications, such as the present invention, this layer is most desirably significantly optically-reflective, while in others it preferably has low reflectivity); and disposed over the rear face of the electrically-insulating layer, an electrically conductive film forming a second electrode-conductive film forming a second electrode—the rear electrode—of the backlight.

The display of the invention may incorporate disposed over the entire rear face of the substrate a single (front) electrode, and disposed over the rear face of the reflective electrically-insulating layer a patterned (rear) electrode defining areas of both the liquid crystal layer and the electroluminescent layer that can be selected to be switched "on" or "off". However, it is possible as an alternative to pattern the front electrode and to have a single "whole-face" rear electrode. Moreover, it is possible for both electrodes to be patterned—as will need be the case if the display is going to be a matrix device where a multitude of very small areas can be illuminated at will so as to enable almost any shape and size of displayed image simply by selecting which areas are lit and which are dark.

According to a third aspect of the invention there is provided a method of reducing fading of an electroluminescent display comprising a mask defining the information to be displayed, an electroluminescent (EL) backlight, the mask comprising a layer of physically-stabilised liquid crystal mounted in front of an EL layer of the backlight, and at least one pair of electrodes arranged to generate, in use, an electric field across both the EL layer and the LC layer, the method comprising providing a barrier layer between the LC layer and the EL layer that restricts migration of liquid crystal from the LC layer to the EL layer.

The method may comprise identifying a material that, when used as a barrier layer, limits the migration of liquid crystal from the LC layer to layers behind the LC layer such that no significant fading of the display occurs due to migration of the liquid crystal and using the identified material for the barrier layer.

According to a fourth aspect of the invention there is provided a method of determining a material suitable for use as a barrier layer in an electroluminescent display comprising forming a layered structure comprising a physically-stabilised liquid crystal (LC) layer mounted in front of a test layer and a layer of material between the LC layer and the test layer that has potential as the material of the barrier layer, heating the layered structure to a predetermined temperature for a predetermined length of time, examining the test layer for liquid crystal migration, and determining whether the material is suitable for use as a barrier layer based on whether there is liquid crystal migration.

The layered structure may comprise a display comprising a mask defining the information to be displayed and an electroluminescent (EL) backlight, the mask comprising a layer of physically-stabilised liquid crystal (LC) mounted in front of an EL layer of the backlight, at least one pair of electrodes arranged to generate, in use, an electric field across both the EL layer and the LC layer and the layer of material that has potential as the material of the barrier layer being between the LC layer and the test layer mounted behind the EL.

The test layer may be of a material in which liquid crystal is soluble and may be an insulator.

The material may be deemed as suitable for use as a barrier layer if there are no visible signs of liquid crystal in the test layer.

According to a fifth aspect of the invention there is provided a method of manufacturing an electroluminescent display comprising forming a mask defining the information to be displayed, the mask comprising a layer of physically stabilised liquid, forming a barrier layer, forming an EL layer of a backlight with the LC layer mounted in front of the EL layer and forming at least one pair of electrodes arranged to generate, in use, an electric field across both the EL layer and the LC layer, wherein the barrier layer is made of material identified as suitable for use as a barrier layer in accordance with the fourth aspect of the invention.

According to a sixth aspect of the invention there is provided an electroluminescent display comprising a mask defining the information to be displayed, an electroluminescent (EL) backlight, the mask comprising a layer of physically-stabilised liquid crystal switchable to define the information to the displayed mounted in front of an EL layer of the backlight, at least one pair of electrodes arranged to generate, in use, an electric field across both the EL layer and the LC layer and a barrier layer between the mask and the EL layer, wherein the barrier layer is made of material identified as suitable for use as a barrier layer in accordance with the fourth aspect of the invention.

The above and other elements, features, steps, characteristics and advantages of the present invention will become more apparent from the following detailed description of the preferred embodiments with reference to the attached drawings.

BRIEF DESCRIPTION OF THE DRAWINGS

Embodiments of the invention will now be described, by example only, with reference to the accompanying drawings, in which:—

FIG. 1 shows a section through a display according to an embodiment of the invention;

FIG. 2 shows the display of FIG. 1 in plan view; and

FIG. 3 is a table illustrating the suitability of different materials as a barrier layer.

DETAILED DESCRIPTION OF THE PREFERRED EMBODIMENTS

The structure of the embodiment of the display of the invention depicted in FIG. 1 of the accompanying drawings can be seen to be, from front to back: a relatively thick protective electrically-insulating transparent front layer (11; the substrate); over the rear face of the substrate 11, a very thin transparent electrically-conductive film (12) forming the front electrode of the display; covering the rear face of the front electrode 12, a relatively thin layer (13) of LC material

(14) physically-stabilised by being dispersed within a supporting polymer matrix (15) (PDLC layer); formed directly on, and covering the rear face of the liquid crystal layer (13), a relatively thin barrier layer (10) of PVA that restricts migration of liquid crystal from the PDLC layer (13) to layers (16, 19,20) to the rear of the LC layer; a relatively thin layer of electroluminescent/phosphor material (17) dispersed within a supporting matrix (18); over the rear face of the phosphor layer (16), a relatively thin optically-reflective electrically-insulating layer (19) of a relatively high dielectric constant material (in the Figure this layer is shown as a seamless extension of the phosphor layer (16); and disposed over the rear face of the reflective electrically-insulating layer (19), an electrically-conductive film (20) forming the rear electrode (s) of the display.

The front and rear electrodes together define discrete areas of both the liquid crystal layer and the electroluminescent layer that can be selected to be switched "on" or "off". In this way, the LC layer defines a mask defining the information to be displayed and the EL layer a backlight to illuminate the areas defined by the mask.

In addition, the back electrode layer may be covered with a protective film (not shown here). The dielectric constant of the electrically insulating layer may be around 50.

The PDLC layer (13) of the display is formed in the manner described in GB 0625114.4 with liquid crystal vesicles encapsulated in a UV cured polyurethane matrix.

It will be understood that the term "relatively thick" means thicknesses in the range of 30 to 300 micrometers. Furthermore, it will be understood that the term "relatively thin" means thicknesses of 50 micrometers or less. In a preferred embodiment, the relatively thick layers are around 100 micrometers and the relatively thin layers are 25 micrometers or less.

FIG. 2 is an example of the types of information that may appear on the display.

A number of materials were evaluated as barrier layers by coating a layer of diluted polymer solution onto a sample of PDLC prepared as described in GB 0625114.4. After drying the layer an EL lamp construction was printed onto the rear side of the layer of diluted polymer solution. Each display was then aged by placing the display in an oven held at 85° C. for approximately 18 to 24 hrs, at which point it was examined for visible signs of liquid crystal/dye migration. A second display having a barrier layer of each material was characterised electro-optically before and after a similar aging process.

FIG. 3 illustrates the results of these tests. As can be seen from FIG. 3, out of the materials tested, Celvol 205 PVA can be identified as particularly suitable for use as the barrier layer with Celvol 205/EAA at a ratio of 9:1 may also be suitable depending on the required electro-optical performance of the display.

Further samples of test displays prepared using PVA as a barrier layer (Mowiol 23-88) were prepared and subjected to a hot-humid aging test at 65° C./90% RH while being driven. It was found that the displays functioned after this test with a small degradation in performance. This was surprising, as it has been found previously that use of a hydrophilic polymer, such as PVA, as the polymer matrix of the PDLC layer can result in poor environmental stability.

It is envisaged that other materials, in particular, other hydrophilic polymers may be suitable for use as a barrier layer. It is believed these suitable materials can be determined by testing the material in the manner described above. The suitability of the material for the barrier layer will depend on the required performance for the display. Therefore, the temperature to which the display is heated and the time for which the display is heated during the test may be varied depending on the required performance. Materials identified as suitable for a barrier layer then can be used to manufacture a display in accordance with the invention.

It is expected that suitable materials will be those in which liquid crystal has low solubility.

In some barrier layers it may also be advantageous to include a polymer to improve the adhesion of the barrier layer with the LC layer and/or the EL layer.

It will be understood that in other embodiments, separate electrodes may be used for driving the backlight and the mask.

It will be understood that it is not necessary to print a whole display in order to test the suitability of a material as a barrier layer but such a determination could be carried out by printing a layer of the material to be tested between a PDLC layer and a test layer, such as an insulator in which liquid crystal is soluble, and carrying out the above-described heat test on the resulting layered structure. If liquid crystal has migrated through to the test layer, the material is deemed inappropriate for use as a barrier layer.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An electroluminescent display comprising:
a mask, including:
an electroluminescent backlight including an electroluminescent layer;
a physically-stabilised liquid crystal layer switchable to define information to be displayed and mounted in front of the electroluminescent layer;
at least one pair of electrodes arranged to generate an electric field across both the electroluminescent layer and the physically-stabilised liquid crystal layer; and
a barrier layer including a hydrophilic material and arranged between the physically-stabilised liquid crystal layer and the electroluminescent layer that restricts migration of liquid crystal from the physically-stabilised liquid crystal layer to the electroluminescent layer.

2. An electroluminescent display according to claim 1, wherein no significant fading of the electroluminescent display occurs due to migration of the liquid crystal.

3. An electroluminescent display according to claim 1, wherein, when the electroluminescent display is heated to 85° C over 18 hours, there is virtually no change in contrast between illuminated and non-illuminated areas of the electroluminescent display.

4. An electroluminescent display according to claim 1, wherein the electroluminescent material backlight includes an insulating layer behind the electroluminescent layer.

5. An electroluminescent display according to claim 1, wherein the barrier layer includes a material in which the liquid crystal has low solubility.

6. An electroluminescent display according to claim 5, wherein the barrier layer includes a material in which the liquid crystal has solubility lower than the solubility of liquid crystal in phosphor.

7. An electroluminescent display according to claim 5, wherein the barrier layer includes a material in which the liquid crystal has a low enough solubility such that no significant fading of layers behind the physically-stabilised liquid crystal layer occurs due to migration of the liquid crystal.

8. An electroluminescent display according to claim 7, wherein the barrier layer includes a material in which the liquid crystal has a low enough solubility such that no significant fading of the layers behind the physically-stabilised liquid crystal layer occurs due to migration of the liquid crystal when the display is heated at a set temperature for a set time.

9. An electroluminescent display according to claim 8, wherein the set temperature is 85° C. and the set time is 18 hrs or more.

10. An electroluminescent display according to claim 5, wherein the barrier layer includes a material in which the liquid crystal has substantially zero solubility at room temperature and atmospheric pressure.

11. An electroluminescent display according to claim 10, wherein the barrier layer includes a material in which the liquid crystal has zero solubility at room temperature and atmospheric pressure.

12. An electroluminescent display according to claim 1, wherein the hydrophilic material is a polymer.

13. An electroluminescent display according to claim 12, wherein the barrier layer includes a polyvinyl alcohol or polyvinyl alcohol copolymer.

14. An electroluminescent display according to claim 13, wherein the polyvinyl alcohol copolymer includes an ethylene vinyl alcohol copolymer.

15. An electroluminescent display according to claim 14, wherein the ethylene vinyl alcohol copolymer includes less than 51% ethylene.

16. An electroluminescent display according to of claim 13, wherein the polyvinyl alcohol or the polyvinyl alcohol copolymer has a degree of hydrolysis of between about 72% and about 99%.

17. An electroluminescent display according to claim 12, wherein the barrier layer includes another polymer that improves the adhesion of the barrier layer with the physically-stabilised liquid crystal layer and/or the electroluminescent layer.

18. An electroluminescent display according to claim 1, wherein a polymer matrix of the physically-stabilised liquid crystal layer is any one of:
    water based, monomer free radiation curable urethane oligomer dispersions;
    acrylic functional polyurethane dispersions; and
    acrylic urethane emulsions.

19. An electroluminescent display according to claim 18, wherein the polymer matrix includes substantially no PVA.

20. An electroluminescent display according to claim 18, wherein the polymer matrix is a UV curable polymer matrix.

21. An electroluminescent display according to claim 20, wherein the polymer matrix is a UV curable aliphatic polyurethane resin.

* * * * *